(12) United States Patent
Cha et al.

(10) Patent No.: US 12,083,975 B2
(45) Date of Patent: Sep. 10, 2024

(54) BUMPER BEAM FOR A MOTOR VEHICLE

(71) Applicants: HYUNDAI MOTOR COMPANY, Seoul (KR); KIA CORPORATION, Seoul (KR)

(72) Inventors: Dong Eun Cha, Hwaseong-si (KR); Jin Young Yoon, Gimpo-si (KR); Hong Heui Lee, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 287 days.

(21) Appl. No.: 17/863,927

(22) Filed: Jul. 13, 2022

(65) Prior Publication Data
US 2023/0144305 A1 May 11, 2023

(30) Foreign Application Priority Data
Nov. 11, 2021 (KR) .......................... 10-2021-0154689

(51) Int. Cl.
*B60R 19/18* (2006.01)
(52) U.S. Cl.
CPC ...... *B60R 19/18* (2013.01); *B60R 2019/1806* (2013.01)
(58) Field of Classification Search
CPC . B60R 19/18; B60R 2019/1806; B60R 19/04; B60R 2019/1853; B60R 19/03; B60R 19/02; B60R 19/023; B60R 2019/1833; B60R 19/34
See application file for complete search history.

(56) References Cited

U.S. PATENT DOCUMENTS

| 6,042,163 | A | * | 3/2000 | Reiffer | B60R 19/18 293/154 |
|---|---|---|---|---|---|
| 10,351,085 | B2 | | 7/2019 | Munjurulimana | |
| 10,399,519 | B2 | | 9/2019 | Sohmshetty et al. | |
| 10,870,403 | B2 | | 12/2020 | Lattorff et al. | |
| 2014/0070552 | A1 | * | 3/2014 | Shimotsu | B60R 19/03 293/102 |
| 2015/0151698 | A1 | * | 6/2015 | Lee | B21D 53/88 293/120 |
| 2016/0144813 | A1 | * | 5/2016 | Clauser | B60R 19/24 293/133 |
| 2017/0274849 | A1 | * | 9/2017 | Jordan | B60R 19/24 |
| 2018/0251174 | A1 | * | 9/2018 | Kamiya | B21D 22/208 |

(Continued)

FOREIGN PATENT DOCUMENTS

| DE | 102018008759 A1 | 4/2019 |
|---|---|---|
| DE | 102016201008 B4 | 5/2019 |

(Continued)

*Primary Examiner* — Lori Lyjak
(74) *Attorney, Agent, or Firm* — McDonnell Boehnen Hulbert & Berghoff LLP

(57) ABSTRACT

The present disclosure discloses a bumper beam for a motor vehicle including a center portion free of mobility-specificity and side portions that may be altered according to design and specification of the mobility to secure collision performance so that the bumper back beam of which collision performance is secured and which satisfies various mobilities may be flexibly applied. Accordingly, it is possible to configure the back beam satisfying various mobilities based on a standardized model to secure collision performance so that manufacturing cost is reduced by assembling and producing the back beams with minimum molds.

10 Claims, 5 Drawing Sheets

(56) References Cited

U.S. PATENT DOCUMENTS

| | | | |
|---|---|---|---|
| 2019/0168700 A1 | 6/2019 | Lattorff et al. | |
| 2019/0176735 A1 | 6/2019 | Hisada et al. | |
| 2021/0339694 A1 * | 11/2021 | Hammer | ................ B60R 19/18 |

FOREIGN PATENT DOCUMENTS

| | | | | |
|---|---|---|---|---|
| DE | 102017222081 A1 | 6/2019 | | |
| DE | 102018209763 A1 | 12/2019 | | |
| EP | 1063135 A2 * | 12/2000 | ............. | B60R 19/18 |
| KR | 200154667 Y1 | 8/1999 | | |
| KR | 101288359 B1 * | 7/2013 | | |
| KR | 20160077790 A * | 7/2016 | | |
| WO | WO-2019138781 A1 * | 7/2019 | ............. | B23P 19/02 |

\* cited by examiner

BUMPER BEAM FOR A MOTOR VEHICLE

CROSS REFERENCE TO RELATED APPLICATION

The present application claims priority to Korean Patent Application No. 10-2021-0154689, filed Nov. 11, 2021, the entire contents of which is incorporated herein for all purposes by this reference.

BACKGROUND

Field

The present disclosure relates to a bumper beam for a motor vehicle. More particularly, the present disclosure relates to a bumper back beam free of mobility-specificity of which collision performance is secured and which may be altered according to design and specification needed in mobility, thereby satisfying various mobilities with minimum molds and allowing flexible applications.

Description of the Related Art

In general, a motor vehicle is provided with bumpers on the front and rear ends to absorb the impact of a collision or mitigate injuries inflicted upon a pedestrian in the event of a collision with the pedestrian.

The bumpers include bumper covers and bumper back beams. Specifically, the bumper covers are mounted at the frontmost and rearmost ends of the vehicle to form the front and rear exterior and to be the first to receive the impact applied from the outside in the event of a collision. The bumper covers have built-in buffer materials so that the impact applied from outside is more easily absorbed.

On the other hand, the bumper back beams are positioned behind the bumper covers to absorb the impact applied through the bumper covers.

Here, the bumper back beam made of a steel material has a problem of increased weight, while the bumper back beam made of a fiber-reinforced thermoplastic has low strength and rigidity.

In addition, the bumper back beam is installed in a crash box to obtain high energy absorption in the event of a collision.

However, in the case of the conventional bumper back beam, the bumper back beam and a crash box are integrated so that the bumper back beam is not replaceable.

That is, the bumper back beam is tailored to a specific vehicle so that the bumper back beam may not be flexibly applied to various vehicle types for replacement purposes.

The development of automotive technology has yet to meet the requirements of the bumper back beam according to various sizes and designs so that there still is a problem that every new automotive mobility needs a newly designed mold.

The matters described above as a technical background are intended only for a better understanding of the background of the present disclosure and are not to be taken as acknowledgment that they pertain to the conventional art already known to those skilled in the art.

SUMMARY

The present disclosure is proposed to resolve the issue described above, and an object of the present disclosure is to provide a bumper back beam of which collision performance is secured and which may be altered according to design and specification needed in mobility, thereby satisfying various mobilities with minimum molds and allowing flexible applications.

To achieve the object described above, the bumper back beam free of mobility-specificity includes a center portion provided with a coupling end part formed at either end, and a side portion positioned at either end of the center portion and provided with a connecting end part having a section overlapping the coupling end part, wherein the center portion and the side portion are coupled to each other through the coupling end part and the connecting end part which are the overlapping sections.

The center portion is made of a continuous fiber-reinforced thermoplastic and the side portion is made of a glass fiber mat plastic.

The coupling end part is formed such that a rear surface is recessed in a form matching the connecting end part so that the connecting end part of the side portion is seated in a recessed portion.

A plurality of recessed portions recessed rearward are formed in the vertical direction in the coupling end part.

A plurality of mounting portions in which the respective recessed portions are seated in a state where the connecting end part matches the coupling end part are formed in the connecting end part.

The recessed portion and mounting portion are fastened by the penetration of a fastening member so that the coupling end part and connecting end part are coupled to each other, and the recessed portion is recessed deep enough for a head part of the fastening member not to protrude forward in a state where the fastening member fastens.

A bush portion is interposed between the recessed portion and the mounting portion and a fastening member fastens through the bush portion so that the coupling end part and the connecting end part are coupled to each other.

The coupling end part and the connecting end part are formed such that the parts facing each other are in linear contact with each other with respect to the front.

The side portion is fixedly fastened to a crash box in a state where the side portion is coupled to the center portion.

A crash box connecting part to be connected to the crash box is formed and a center extending part is formed between the crash box connecting part and connecting end part in the side portion.

The length of the center extension part in the side portion is altered according to the overall width of the mobility.

The bumper back beam free of mobility-specificity structured as described above includes the center portion free of mobility-specificity and the side portion that may be altered according to the design and specification of mobility in order to secure collision performance so that the back beam of which collision performance is secured and which satisfies various mobilities may be flexibly applied.

Accordingly, it is possible to configure the back beam satisfying various mobilities based on a standardized model to secure collision performance so that manufacturing cost is reduced by assembling and producing the back beams with minimum molds.

DETAILED DESCRIPTION

Hereinafter, a bumper back beam free of mobility-specificity according to a preferable embodiment of the present disclosure will be described with reference to the accompanying drawings.

Figure 1:
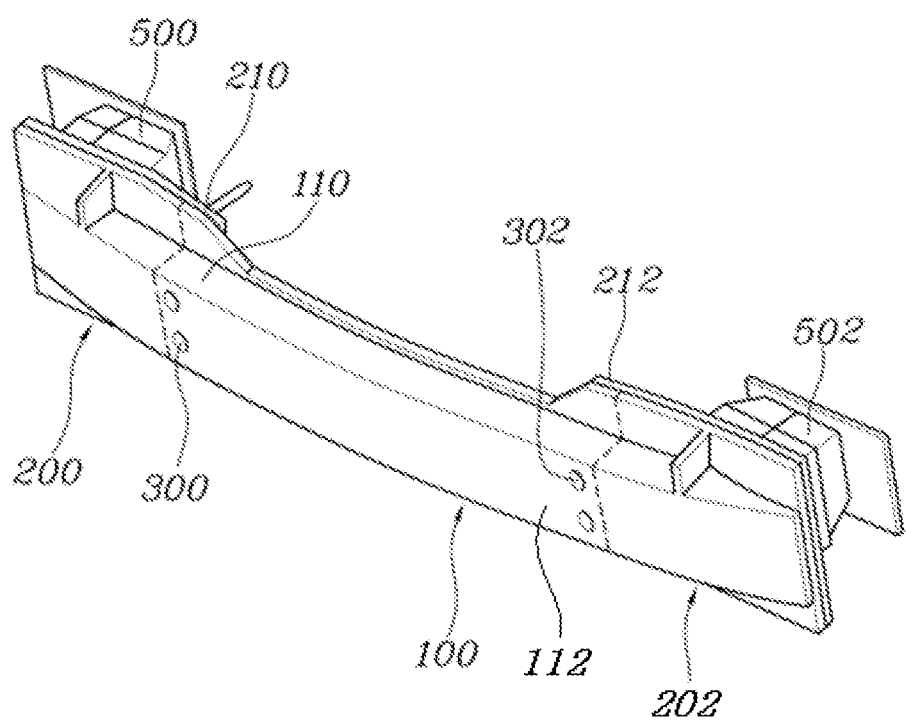
FIG. 1 is a view of a bumper back beam free of mobility-specificity according to the present disclosure.
Figure 2:
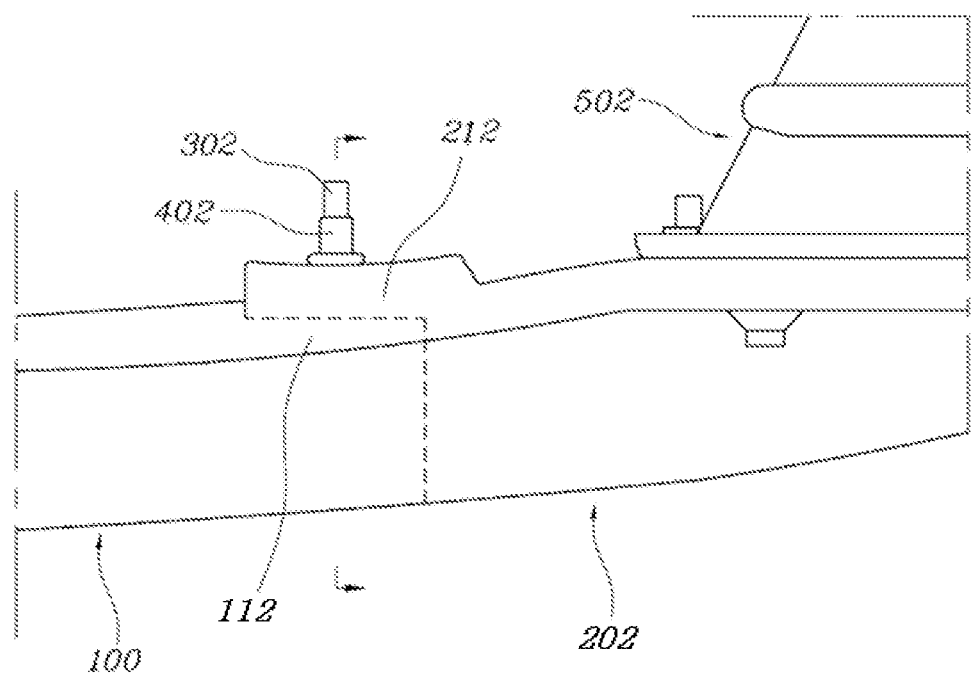
FIG. 2 is a top view of the bumper back beam free of mobility-specificity shown in FIG. 1.
Figure 3:
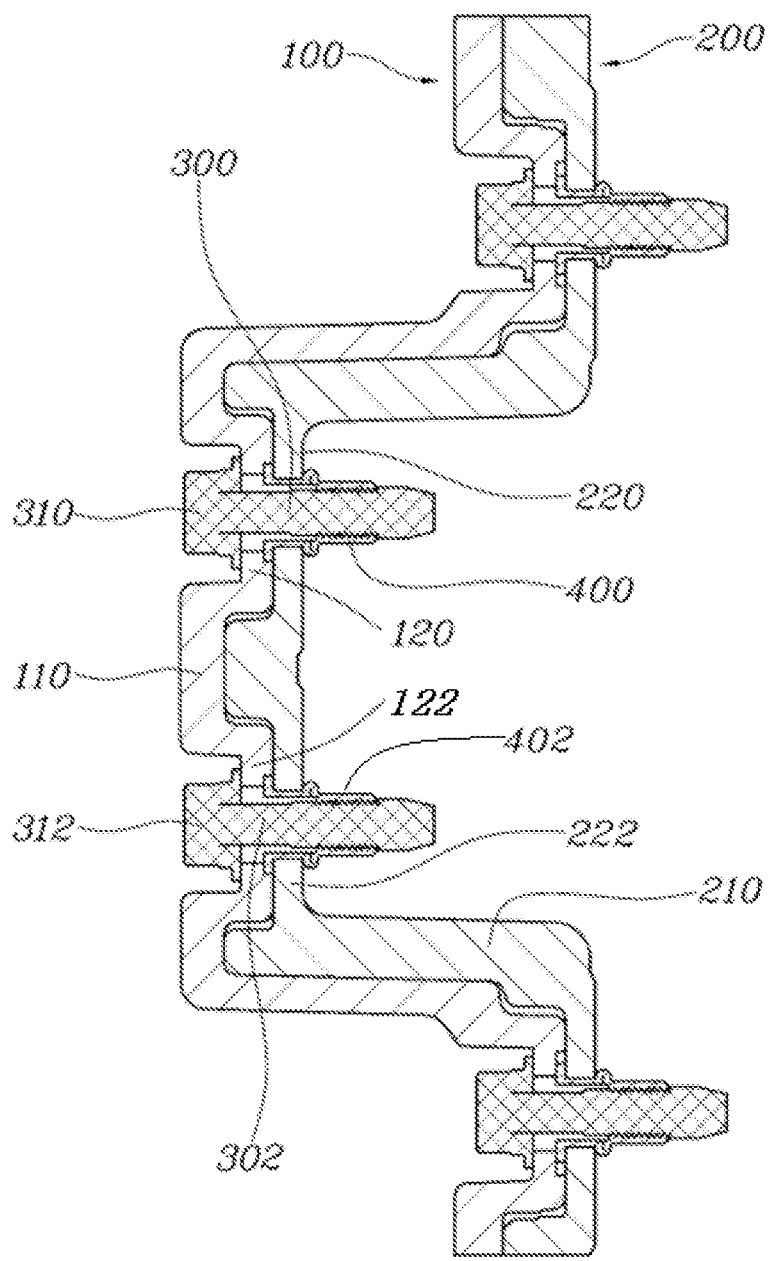
FIG. 3 is a cross-sectional view of the bumper back beam free of mobility-specificity shown in FIG. 1.

As shown in FIGS. 1 to 3, the bumper back beam free of mobility-specificity according to the present disclosure includes a center portion 100 made of a continuous fiber-reinforced thermoplastic, a first side portion 200 positioned at a first end of the center portion 100, and a second side portion 202 positioned at a second end of the center portion 100. The first and second side portions 200, 202 are made of glass fiber mat plastic.

Here, the center portion 100 may be manufactured by shape-processing continuous fiber-reinforced thermoplastic including glass fiber or carbon fiber by a hot pressing method.

Since the center portion 100 is the first to receive the impact and deform in the event of a collision, the center portion 100 may be formed in a skeletal structure based on impact performance and be fixed in a shape optimized for collision performance to be equally applicable to all mobilities. Accordingly, the center portion 100 secures an impact height and collision performance of the geometric conditions.

The side portions 200, 202 may be manufactured by shape-processing, by a hot pressing method, glass fiber mat thermoplastic of which the degree of freedom in shaping may be maximized compared with the center portion 100.

That is, the secured design freedom allows the side portions 200, 202 to be designed into various forms according to design and specification of the mobility while supporting the center portion 100.

The present disclosure standardizes the center portion 100 of which the collision performance is secured and replaces the side portions 200, 202 according to the design and specification of the mobility in configuring the bumper back beam so that replacement of the side portions allows flexible application according to the design and specification of the mobility even when the width between the side members of the mobility changes.

In particular, the center portion 100 and the side portions 200, 202 have overlapping sections, and are coupled to each other over the overlapping sections.

The partial overlapping structure of the center portion 100 and each side portion 200, 202 ensures that the coupling rigidity between the center portion 100 and the side portion is secured. At this time, the overlapping structure of the center portion 100 and the side portions 200, 202 in the front-rear direction leads to an advantage in dispersing the impact in the event of a collision and securing the collision rigidity.

In addition, the center portion 100 and the side portions 200, 202 are overlapped with each other such that the center portion 100 is disposed in front of the side portions so that the center portion 100 to which impact is first applied in the event of a collision attenuates the impact through deformation.

In this way, the present disclosure secures the fastening strength and collision rigidity through the connecting structure between the center portion 100 and the side portions 200, 202.

To be specific about the present disclosure described above, as shown in FIGS. 2 and 3, coupling end parts 110, 112 are formed at either end of the center portion 100, and the side portions 200, 202 extend to the rear of the coupling end parts 110, 112 in a state where the side portions 200, 202 are disposed at either end of the center portion 100, such that the connecting end parts 210, 212 each have a section overlapping the coupling end parts 110, 112 are formed.

The coupling end parts 110, 112 are formed at either end of the center portion 100, the side portions 200, 202 are respectively disposed at either end of the center portion 100, and the connecting end parts 210, 212 overlap and are connected to the coupling end parts 110, 112.

This configuration enhances coupling rigidity, and the collision rigidity is secured by the advantage in dispersing the impact. Here, in the section where the coupling end parts 110, 112 and the connecting end parts 210, 212 overlap with each other, the length of the overlapping section is to be 50 mm or more and the thickness is to be 10 mm or more in order to secure robust coupling performance.

In addition, each connecting end part 210, 212 extends to the rear of the each coupling end part 110, 112 so that the center portion 100 may first deform by the collision to absorb the impact and the impact may be dispersed as the side portions 200, 202 stably support the center portion 100.

On the other hand, as shown in FIG. 2, the coupling end parts 110, 112 are formed such that a rear surface is recessed in a form matching the connecting end parts 210, 212 so that the connecting end part of each side portion 200, 202 is seated in a recessed portion.

In this way, the connecting end part 210 of the side portion 200 overlaps, and is coupled to, the coupling end part 110 of the center portion 100 from the rear, and the coupling end part 110 is formed such that the rear surface is recessed in a form matching the connecting end part 210 so that the connecting end part 210 is seated in the coupling end part 110.

This allows regulation of the coupling position of the coupling end parts 110, 112 and the connecting end parts 210, 212 by seating each connecting end part 210, 212 in the respective coupling end part 110, 112 at the time of coupling with each other.

In addition, since each connecting end part 210, 212 is seated in the respective coupling end part 110, 112, the coupling rigidity between each coupling end part and each connecting end part increases.

On the other hand, as shown in FIG. 3, a plurality of recessed portions 120 recessed rearward are formed in the vertical direction in the coupling end part 110 and mounting portions 220, on the front surfaces of which the respective recessed portions 120 are seated in a state where the connecting end parts 210, 212 match the coupling end parts 110, 112, are formed in the connecting end parts.

The present disclosure illustrates the center portion 100 and the side portions 200, 202 in a 'C' shape, but various shapes may be applied to the center portion 100 and the side portions depending on the layout that considers the bumper back beam rigidity, design, and the like.

Here, recessed portions 120, 122 recessed from the front to the rear are formed in the coupling end parts 110, 112 of the center portion 100, and mounting portion 220, 222 is formed in the connecting end parts 210, 212 such that the mounting portions may match the recessed portions 120, 122. The recessed portions 120, 122 may be inserted into the mounting portions 220, 222 so that the recessed portions are inserted into the mounting portions 220, 222 when the coupling end parts 110, 112 and the connecting end parts 210, 212 are matched.

This allows the coupling end parts 110, 112 and the connecting end parts 210, 212 to be in a temporarily fixed state by the recessed portions 120, 122 and the mounting portions 220, 222 so that coupling through the fastening of fastening members 300, 302 is made easy. The fastening member 300 may be a bolt.

The recessed portions 120, 122 and the mounting portions 220, 222 are parts that the fastening members 300, 302 fastens, and the number of formations may be determined according to the coupling rigidity between the center portion 100 and the side portions 200, 202.

The recessed portions 120, 122 and the mounting portions 220, 222 may be fastened by the penetration of the fastening members 300, 302 so that the coupling end parts 110, 112 and the connecting end parts 210, 212 may be coupled to each other, and the recessed portions 120, 122 may be recessed deep enough for the head parts 310, 312 of the fastening members 300, 302 not to protrude forward in a state where fastening members 300, 302 fasten.

That is, the recessed portions 120, 122 are recessed deeper than the head parts 310, 312 of the fastening members 300, 302 so that the head parts do not protrude forward of the center portion 100 when the recessed portions 120, 122 and the mounting portions 220, 222 are fastened by the penetration of the fastening members 300, 302. This allows the fastening members 300, 302 to avoid the firsthand impact in the event of a collision so that separation between the center portion 100 and the side portions 200, 202 caused by the damage to the fastening member is prevented.

On the other hand, bush portions 400, 402 are interposed between the recessed portions 120, 122 and the mounting portions 220, 222, and the fastening members 300, 302 fastens through the bush portions 400, 402 so that the coupling end parts 110, 112 and the connecting end parts 210, 212 may be coupled to each other.

As shown in FIG. 3, each bush portion 400, 402 may be mounted in a recessed portion 120, 122 or a mounting portion 220, 222, and each bush portion 400, 402 is interposed between, and firmly fixes, the recessed portion 120, 122 and the mounting portion 220, 222 when the coupling end part 110, 112 and the connecting end part 210, 212 are coupled to each other. In addition, the fastening members 300, 302 are screwed into the bush portions 400, 402 to be firmly mounted through the bush portions so that the coupling end parts 110, 112 and the connecting end parts 210, 212 may be firmly coupled to each other through the fastening members 300, 302.

On the other hand, as shown in FIG. 2, the coupling end parts 110, 112 and the connecting end parts 210, 212 are formed such that the parts facing each other are in linear contact with each other with respect to the front.

The coupling end parts 110, 112 and the connecting end parts 210, 212 are matched in the longitudinal direction and the facing parts are matched on a straight line. This improves the convenience of assembling the coupling end parts 110, 112 and the connecting end parts 210, 212 when coupled to each other.

In addition, the center portion 100 receives the impact first in the event of a collision, and the collision performance is secured by the deformation of the center portion 100 and the transfer of the impact to the side portions 200, 202.

On the other hand, the side portions 200, 202 are each fixedly fastened to a crash box 500, 502 in a state where the side portions 200, 202 are coupled to the center portion 100 so that the bumper back beam according to the present disclosure may be mounted in the mobility. The side portions 200, 202 and the crash boxes 500, 502 may be bolted together, for example.

In this way, the present disclosure standardizes the center portion 100 of which the collision performance is secured and replaces the side portions 200, 202 according to the design and specification of the mobility in configuring the bumper back beam so that replacement of the side portions 200, 202 allow flexible application according to the design and specification of the mobility even when the width between the side members of the mobility changes.

That is, crash box connecting parts 230, 232 to be connected to the crash boxes 500, 502 are formed, and center extending parts 240, 242 are formed between the crash box connecting parts 230, 232 and the connecting end parts 210, 212 in the side portions 200, 202. This allows the side portions 200, 202 to be bolted to the crash boxes 500, 502 through the crash box connecting parts 230, 232. Vertical extension of the crash box connecting pas 230, 232 toward the crash box 500, 502 secures support rigidity between the side portions 200, 202 and the crash boxes 500, 502.

In particular, the length of the center extending parts 240, 242 of the side portions 200, 202 is altered according to the full length of the mobility so that the side portions 200, 202 may be applied to various mobilities by adjusting the length of the center extending parts 240, 242 only while maintaining the shapes of the parts to be connected to the center portion 100 and the crash boxes 500, 502.

Figure 4:
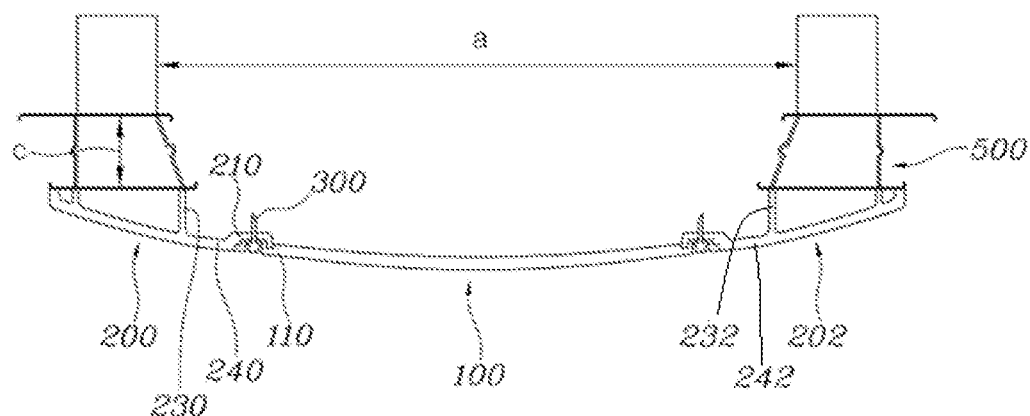
FIG. 4 is a view for describing an application example of the bumper back beam free of mobility-specificity according to an embodiment of the present disclosure.
Figure 5:
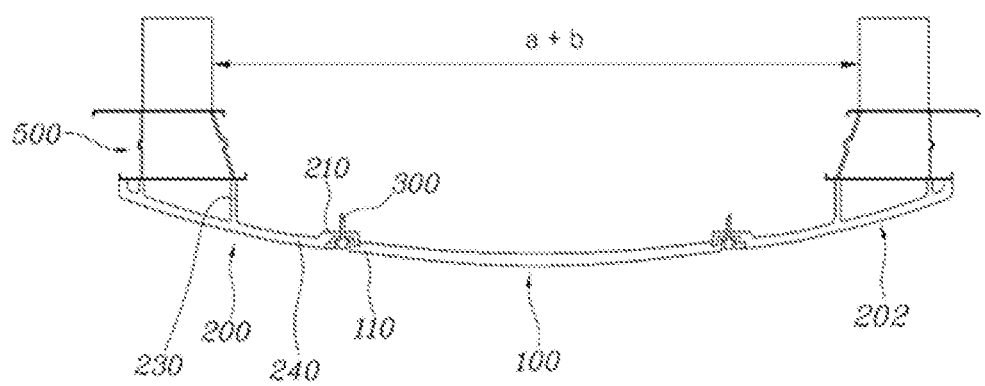
FIG. 5 is a view for describing an application example of the bumper back beam free of mobility-specificity according to another embodiment of the present disclosure.

That is, a comparison between FIGS. 4 and 5 shows that, even when the distance differs between the side members, the same center portion 100 is used and only the side portions 200, 202 is replaced so that the distance difference between the side members may be dealt with by changing the length of the side portions 200, 202.

Figure 6:
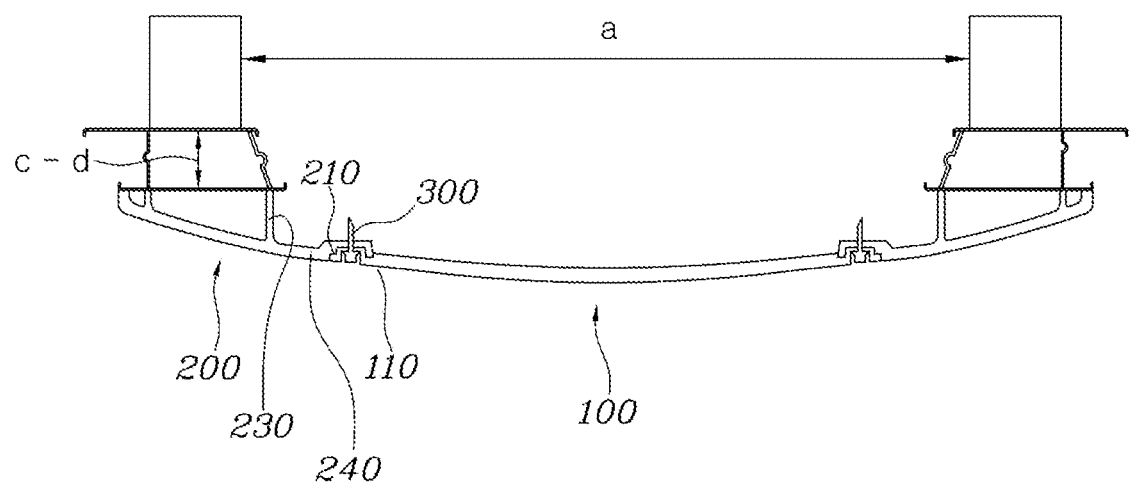
FIG. 6 is a view for describing an application example of the bumper back beam free of mobility-specificity according to still another embodiment of the present disclosure.

In addition, a comparison between FIGS. 4 and 6 shows that, even when the length differs between the crash boxes 500, 502, the same center portion 100 is used and only the side portion 200 is replaced so that the length difference between the crash boxes 500, 502 may be dealt with.

The bumper back beam free of mobility-specificity having the structure as described above includes the center portion 100 flee of mobility-specificity and the side portions 200, 202 that may be altered according to design and specification of mobility in order to secure collision performance so that the back beam of which collision performance is secured and which satisfies various mobilities may be flexibly applied.

Accordingly, it is possible to configure the back beam satisfying various mobilities based on a standardized model to secure collision performance so that manufacturing cost is reduced by assembling and producing the back beams with minimum molds.

The specific embodiments of the present disclosure are illustrated and described, but it will be self-evident to those skilled in the art that the present disclosure may be improved upon and modified in various ways within the scope not departing from the technical spirit of the present disclosure provided by the patent claims below.

What is claimed is:

1. A bumper beam for a motor vehicle, comprising:
a center portion having a first coupling end part at a first end and a second coupling end part formed at a second end; and
a first side portion positioned at the first end of the center portion and a second side portion positioned at the second end of the center portion, wherein the first side portion is connected to a first connecting end part through the first coupling end part and having a section overlapping with the first coupling end part, and the second side portion is connected to a second connecting end part having a section overlapping with the second coupling end part.

2. The bumper beam of claim 1, wherein the center portion is made of a continuous fiber-reinforced thermoplastic, and each of the side portions are made of glass fiber mat plastic.

3. The bumper beam of claim 1, wherein each of the first and second coupling end parts are formed such that arear surface is recessed in a form matching the respective connecting end part so that each of the connecting end parts of each of the side portions is seated in a recessed portion.

4. The bumper beam of claim 1, wherein a plurality of recessed portions recessed rearward are formed in the vertical direction in each of the first and second coupling end parts, and
wherein each of the connecting end parts includes a plurality of mounting portions on front surfaces of which the respective recessed portions are seated in a state where each of the connecting end parts matches each of the coupling end parts.

5. The bumper beam of claim 4, wherein the plurality of recessed portions and the plurality of mounting portions are fastened by penetration of a fastening member so that each coupling end part is coupled to each connecting end part, and
the plurality of recessed portions are recessed deep enough for a head part of the fastening member not to protrude forward when the fastening member fastens.

6. The bumper beam of claim 5, wherein a bush portion is interposed between each of the plurality of recessed portions and each of the plurality of the mounting portions, and the fastening members fasten through the bush portions so that each of the coupling end parts and each of the connecting end parts are coupled to each other.

7. The bumper beam of claim 1, wherein each of the coupling end parts and each of the connecting end parts are formed such that parts facing each other are in linear contact with each other with respect to the front.

8. The bumper beam of claim 1, wherein each of the side portions is fixedly fastened to a crash box when each of the side portions is coupled to the center portion.

9. The bumper beam of claim 8, wherein each of the crash boxed include a crash box connecting part to be connected thereto, and a center extending part is formed between each of the crash box connecting parts and each of the connecting end parts in each of the side portions.

10. The bumper beam of claim 9, wherein a length of the center extending part in each of the side portions is altered according to a full length of mobility.

* * * * *